(12) United States Patent
Morenko et al.

(10) Patent No.: US 12,228,284 B2
(45) Date of Patent: Feb. 18, 2025

(54) NOZZLE TIP WITH SHIELDED CORE FOR A DUAL COMBUSTION SYSTEMS

(71) Applicant: Pratt & Whitney Canada Corp., Longueuil (CA)

(72) Inventors: Oleg Morenko, Oakville (CA); Sandeep Vishal Dhalla, Woodbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 11 days.

(21) Appl. No.: 17/322,812

(22) Filed: May 17, 2021

(65) Prior Publication Data

US 2022/0364509 A1   Nov. 17, 2022

(51) Int. Cl.
*F23R 3/28* (2006.01)
*F02C 7/22* (2006.01)

(52) U.S. Cl.
CPC .............. *F23R 3/283* (2013.01); *F02C 7/22* (2013.01); *F05D 2220/323* (2013.01)

(58) Field of Classification Search
CPC ............ F23R 3/28–283; F23R 3/34–36; F23D 11/10–101; F23D 11/104–12; F23D 2204/10; F23D 2900/11101; F23D 17/002; F02C 7/2365; F02C 9/40
See application file for complete search history.

(56) References Cited

U.S. PATENT DOCUMENTS

| | | |
|---|---|---|
| 4,600,151 A * | 7/1986 | Bradley .................. F23L 7/002 239/404 |
| 1,854,127 A | 8/1989 | Vinson et al. |
| 6,622,488 B2 | 9/2003 | Mansour et al. |
| 8,096,135 B2 | 1/2012 | Caples |
| 8,196,845 B2 | 6/2012 | Thomson et al. |
| 8,240,151 B2 * | 8/2012 | Pelletier .................. F23R 3/283 60/742 |
| 8,336,313 B2 | 12/2012 | McMasters et al. |
| 9,383,107 B2 | 7/2016 | Shershnyov et al. |
| 9,488,371 B2 * | 11/2016 | Shi ........................... C10J 3/503 |

(Continued)

FOREIGN PATENT DOCUMENTS

| | | |
|---|---|---|
| CN | 112254172 A | 1/2021 |
| EP | 0071420 A1 | 2/1983 |

(Continued)

OTHER PUBLICATIONS

Extended European Search Report for European Patent Application No. EP22173883.4, dated Oct. 11, 2022.

*Primary Examiner* — David P. Olynick
(74) *Attorney, Agent, or Firm* — NORTON ROSE FULBRIGHT CANADA LLP

(57) ABSTRACT

In one aspect of the present disclosure, there is provided a nozzle assembly comprises a first fuel conduit defined between a nozzle body and a fuel swirler and extending along a longitudinal axis from an inlet of the first fuel conduit to an outlet of the fuel nozzle assembly. A second fuel conduit is defined between the fuel swirler and a heat shield and extending along the fuel swirler along the longitudinal axis from an inlet of the second fuel conduit to the outlet of the fuel nozzle assembly. An air conduit extends through the heat shield along the longitudinal axis from an inlet of the air conduit to the outlet of the fuel nozzle assembly.

13 Claims, 2 Drawing Sheets

(56) References Cited

U.S. PATENT DOCUMENTS

| | | | |
|---|---|---|---|
| 9,562,692 B2 | 2/2017 | Williams et al. | |
| 9,618,209 B2 | 4/2017 | Bandaru et al. | |
| 10,794,596 B2 * | 10/2020 | Dai | F23R 3/12 |
| 11,274,831 B2 * | 3/2022 | Sanchez | F23D 11/383 |
| 2009/0111063 A1 | 4/2009 | Boardman et al. | |
| 2009/0255258 A1 | 10/2009 | Bretz et al. | |
| 2012/0180486 A1 | 7/2012 | Kim et al. | |
| 2014/0291418 A1 | 10/2014 | Ruffing et al. | |
| 2015/0253009 A1 | 9/2015 | Bandaru et al. | |
| 2015/0337730 A1 * | 11/2015 | Kupiszewski | F02C 7/16 |
| | | | 60/39.465 |
| 2016/0116168 A1 * | 4/2016 | Bandaru | F23R 3/28 |
| | | | 60/39.48 |
| 2016/0209037 A1 | 7/2016 | Dai et al. | |
| 2016/0252252 A1 | 9/2016 | Dai et al. | |
| 2020/0003421 A1 | 1/2020 | Sanchez | |

FOREIGN PATENT DOCUMENTS

| | | |
|---|---|---|
| EP | 3628925 A1 | 4/2020 |
| WO | 2020/180294 A1 | 9/2020 |

\* cited by examiner

NOZZLE TIP WITH SHIELDED CORE FOR A DUAL COMBUSTION SYSTEMS

FIELD

This disclosure relates generally to fuel injection for gas turbine engines, and more particularly to applications with dual fuel injection. There is always a need in the art for improvements fuel nozzles in the aerospace industry.

SUMMARY

In one aspect of the present disclosure, there is provided a nozzle assembly comprises a first fuel conduit defined between a nozzle body and a fuel swirler and extending along a longitudinal axis from a first location of the first fuel conduit to an outlet of the fuel nozzle assembly. A second fuel conduit is defined between the fuel swirler and a heat shield and extending along the fuel swirler along the longitudinal axis from a second location of the second fuel conduit to the outlet of the fuel nozzle assembly. An air conduit extends through the heat shield along the longitudinal axis from an inlet of the air conduit to the outlet of the fuel nozzle assembly.

In embodiments, the first fuel conduit and the second fuel conduit are annular and the second fuel conduit is positioned radially inward from the first fuel conduit. The air conduit is cylindrical and positioned radially inward from the second fuel conduit. In certain embodiments, an inlet of the air conduit is upstream of both the first and second locations of the first and second fuel conduits.

In certain embodiments, the heat shield is an inner heat shield and the fuel nozzle assembly further comprises an outer heat shield mounted to the nozzle body. In certain such embodiments, the outer heat shield further includes an air cap radially outward of the outer heat shield forming an insulative air gap therebetween. In embodiments, the air cap further includes an outer air conduit defined therein.

In embodiments, a feed arm mounted to the outer nozzle body. At least a portion of the first fuel conduit is contained within the feed arm, such that the first fuel conduit passes laterally through the nozzle body into an annular space between the nozzle body and fuel swirler. At least a portion of the second fuel conduit is contained within the feed arm, such that the second fuel conduit passes from the feed arm, through a lateral port through the outer nozzle body, and into an annular space between the fuel swirler and the inner heat shield.

In embodiments, an upstream seal and a downstream seal between the feed arm and the nozzle body, and are positioned such that the portion of the first fuel conduit contained within the feed arm is positioned between the upstream seal and the downstream seal. In embodiments, an upstream portion of the inner heat shield is sealed to the fuel swirler to prevent backflow from the second fuel conduit into a compressor space upstream of the inner air conduit.

In certain embodiments, an upstream end of the inner air conduit is larger in diameter than a downstream end of the of the inner air conduit, and the upstream end of the inner air conduit is shorter axial length than the downstream portion of the inner air conduit. In certain embodiments, the inner air conduit extends from a position upstream of the second location of the second fuel conduit, to a position at the downstream end of the first fuel conduit. In certain such embodiments, the first fuel conduit extends along a majority of the axial length of the second fuel conduit.

The first fuel conduit is configured for issuing first fuel as a swirling, atomized spray into a combustor space, and the second fuel conduit includes a hydrogen gas fuel conduit. The first fuel conduit and the second fuel conduit are fluidly isolated from one another within the nozzle body. In embodiments, the air conduit is devoid of any air swirlers.

In another aspect of the present disclosure, there is provided a method of thermal management for fuel injection. In certain embodiments, the method includes combusting a first fuel from a first fuel conduit in a fuel nozzle, staging off flow of the first fuel through the first fuel conduit, staging on flow of a second fuel through a second fuel conduit and combusting the second fuel from the second fuel conduit, during the combusting the second fuel from the second fuel conduit, cooling the first fuel conduit with flow of the second fuel through the second fuel conduit.

In embodiments, the cooling of the first fuel conduit further includes maintaining a temperature of the first fuel conduit below a break down temperature above which the first fuel forms coke deposits. In certain embodiments, the method further includes preventing back flow from the second fuel conduit into a compressor space upstream of an air conduit, where the air conduit is defined within a heat shield radially inboard of the second fuel conduit. In certain embodiments, the method further includes thermally insulating the second fuel conduit and from hot compressor air within the air conduit with the heat shield.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
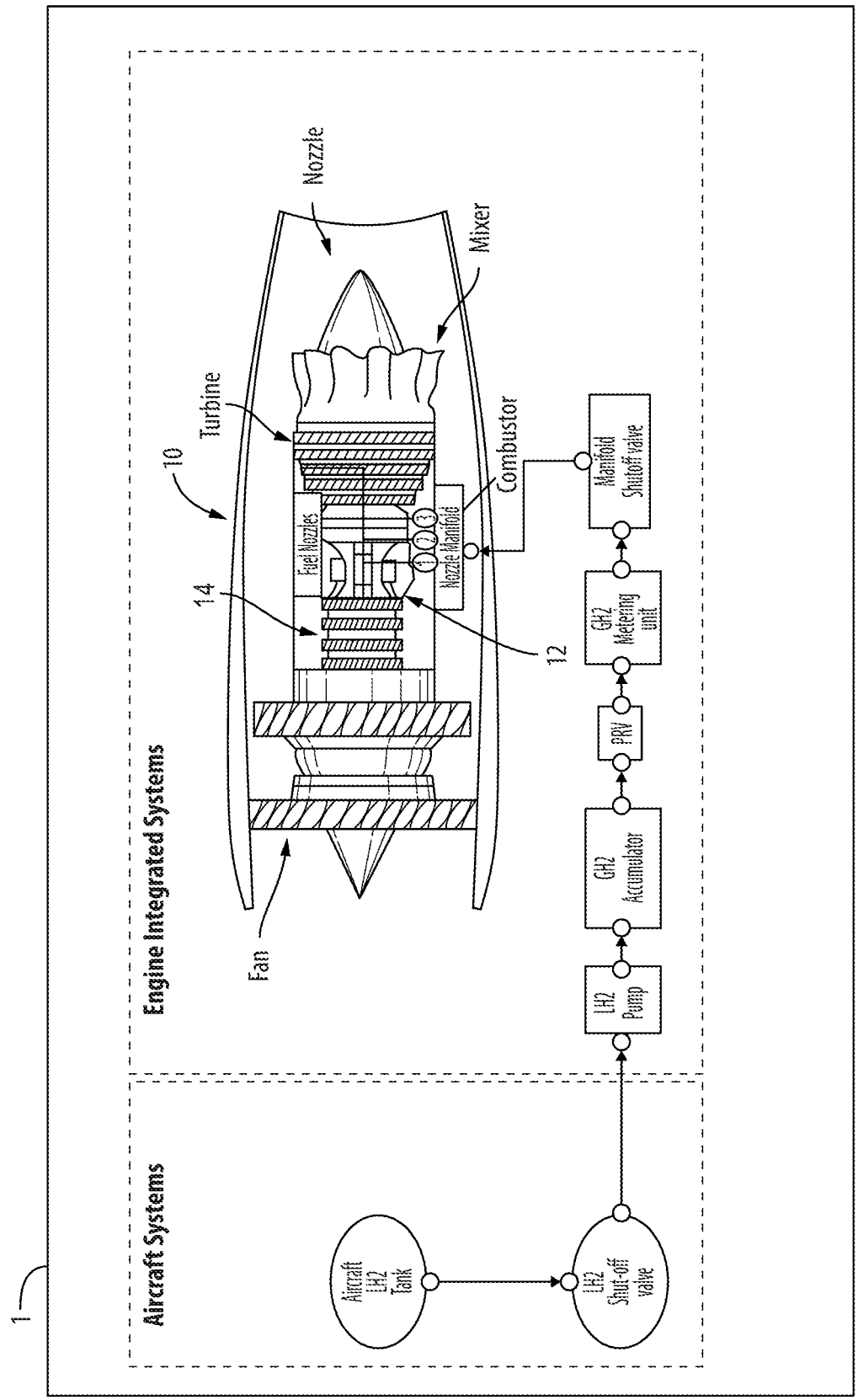
FIG. 1 is a schematic view of an embodiment of an aircraft in accordance with this disclosure.
Figure 2:
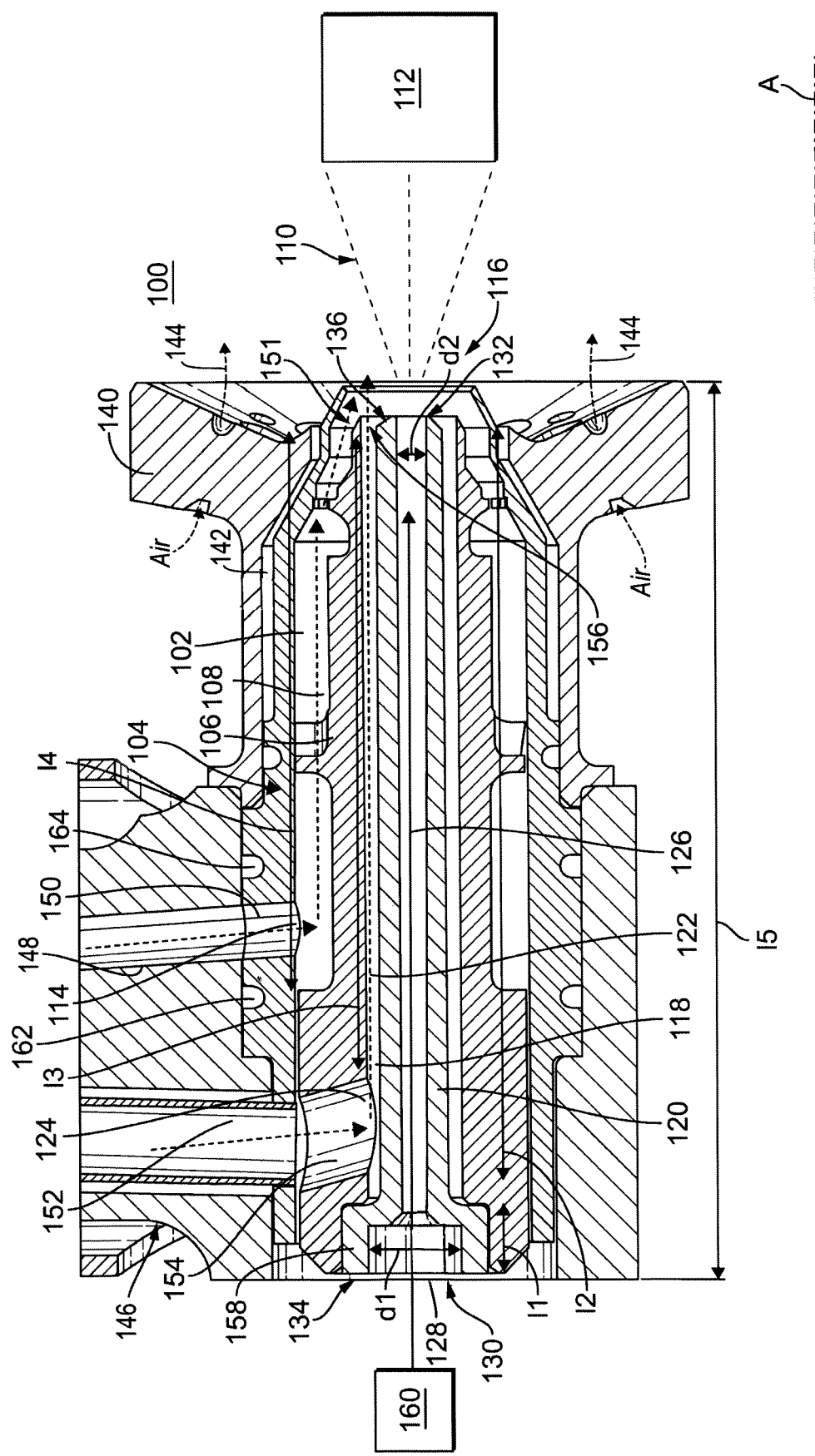
FIG. 2 is a schematic perspective view of an embodiment of a nozzle assembly constructed in accordance with the present disclosure, showing an arrangement of air and fuel conduits.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to improve fuel mixing and combustion.

In certain embodiments, referring to FIG. 1, an aircraft 1 can include an engine 10, where the engine can be a propulsive energy engine (e.g. creating thrust for the aircraft 1), or a non-propulsive energy engine, and a fuel system 100. A compressor 14 supplies pressurized air to a primary gas path 12 (e.g. as shown in FIG. 1) of the aircraft engine 10, the primary gas path 12 including fluidly in series a combustor and nozzle manifold for issuing fluid to the combustor.

The nozzle manifold can include a nozzle assembly 100 defining a longitudinal nozzle axis A, and comprises an annular first fuel conduit 102 defined between an outer nozzle body 104 and a fuel swirler 106 configured to issue first fuel 108 as a swirling, atomized spray 110 into a combustor space 112. The first fuel conduit 102 can extend from an upstream first location 114 to an outlet 116. An annular second fuel conduit 118 is defined between the fuel swirler 106 and an inner heat shield 120 configured to issue second fuel 122 into the combustor space 112 to mix with the first fuel 108. Within the nozzle body 104, the first fuel conduit 102 and the second fuel conduit 118 can be fluidly isolated from one another.

The second fuel conduit 118 can extend from an upstream second location 124 to the outlet 116. In embodiments, the second location 124 is upstream of the first fuel location 114, relative to axis A. As shown, the second fuel conduit 118 can be positioned radially inward from the first fuel conduit 102. In embodiments, the first fuel 108 and the second fuel 122 can include any suitable combination of fuels, such as a liquid fuel (e.g. kerosene and/or biofuel) and or a gaseous fuel (e.g. at least a portion of hydrogen gas, and/or natural gas, or pure hydrogen gas), or both the first and second fuels 108, 122 can be liquid fuels.

A cylindrical air conduit 126 is defined within a heat shield 120, extending downstream from an upstream air inlet 128 to the outlet 116 and can be positioned radially inward from the second fuel conduit 118. The upstream air inlet 128 is upstream of both the first location 114 and the second location 124, relative to axis A. In certain embodiments, the air conduit 126 can be devoid of any air swirlers or any other mixing features disposed therein. As shown, an upstream end 130 of the air conduit 126 can be larger in diameter d1 than a downstream end 132 of the of the air conduit 126 (e.g. d2), and the upstream end 130 of the air conduit 126 can have a shorter axial length l1 than the downstream portion 132 of the air conduit 126 (e.g. l2).

In certain embodiments, the first fuel conduit 102 can have an axial length l4 extending along a majority of the axial length l3 of the second fuel conduit 118, for example, the first fuel conduit axial length l4 extending along at least half the axial length l3 of the second fuel conduit 118, or along at least 75% of the axial length l3 of the second fuel conduit 118. Extending the second fuel conduit 118 over a greater length of the nozzle body 104 (l5) and providing a relatively narrow passage, the second fuel 122 within the second fuel conduit 118 will act to cool the surrounding nozzle components for a longer period of time and more efficiently, than having a shorter second fuel conduit, for example. The air conduit 126 can extend from a position 134 upstream of the second location 124, to a position 136 at the downstream end of the first fuel conduit 118, for example extending beyond both the first and second fuel conduits 102, 118, and along the entire axial length l5 of the nozzle body 104. As appreciated by those having ordinary skill in the art, the size, shape, and orientation of each of the air and/or fuel conduits relative to one another can be optimized to achieve specific benefits and/or nozzle performance as needed or desired, without departing from the scope of this disclosure.

The nozzle 100 includes a second heat shield. The second heat shield may include an air cap 140 mounted to the nozzle body 104. The air cap 140 is radially outward of the nozzle body 104 forming an insulative air gap 142 between the air cap 140 and the nozzle body 104. The air cap can 140 include an outer air conduit (e.g. orifices 144) defined therein. Both the inner and outer air 10 conduits 126, 144 deliver air that may or may not be compressed to the nozzle 100 to combine with the first and second fuels 108, 122. Any suitable number of orifices can be used in the inner and outer air conduits 126, 144, and the size, shape and area of the air conduits 126, 144 can be optimized for the desired air to fuel ratio for ignition and operation, as appreciated by those having ordinary skill in the art.

A feed arm 146 is mounted to the outer nozzle body 104 for issuing the first and second fuel 108, 122 to the nozzle body. At least a portion 148 of the first fuel conduit 102 is contained within the feed arm 146, such that the first fuel conduit 102 passes laterally through a lateral port 150 in the outer heat shield 138 into an annular space 151 between the outer nozzle body 104 and the fuel swirler 106. Similarly, at least a portion 152 of the second fuel conduit 118 is contained within the feed arm 146, such that the second fuel 122 passes from the feed arm 146, through a lateral port 154 through the outer nozzle body 104 and fuel swirler 106, and into an annular space 156 between the fuel swirler 106 and the heat shield 120.

As shown, the second fuel 122 is injected from the feed arm 146 into the nozzle body 104 within the second fuel conduit 118, and not directly into the air conduit 126. Instead, an upstream portion 158 of the inner heat shield 120 is sealed to the fuel swirler 106 to keep the second fuel 122 fluidly isolated from the inner air conduit 126 altogether within the nozzle body 104, and to prevent backflow from the second fuel conduit 118 into a compressor space 160 upstream of the inner air conduit 126. The second fuel 122 should not mix with the high pressure, high velocity hot air (e.g. air in air conduit 126) either within the engine compressor space 160, or within the air conduit 126 to avoid combustion of the second fuel 122 anywhere outside of the combustor space 112.

An upstream seal 162 and a downstream seal 164 are configured to seal between the feed arm 146 and the outer nozzle body 104. As shown, the seals 162, 164 can be positioned such that the portion 148 of the first fuel conduit 102 contained within the feed arm 146 is situated between the upstream seal 162 and the downstream seal 164. Any number of additional seals may be included as needed, and in any suitable position.

In another aspect of the present disclosure, there is provided a method of thermal management for fuel injection, for example in nozzle 100. In certain embodiments, the method includes combusting first fuel 108 from the first fuel conduit 102 in the fuel nozzle 100; staging off flow of the first fuel 108 through the first fuel conduit 102; staging on flow of second fuel 122 through the second fuel conduit 118 and combusting the second fuel 122 from the second fuel conduit 118; and during the combusting the second fuel 122, cooling the first fuel conduit 102 with flow of the second fuel 122 through the second fuel conduit 118. The method includes issuing air through any one of inner air conduit 126 and/or outer air conduit (orifices 144), without passing the air through any air swirlers or mixing features within the respective air conduits 126, 144.

Cooling the first fuel 108 can further include maintaining a temperature of the first fuel conduit 102 below a break down temperature, above which the first fuel 108 forms coke deposits. Preventing coking in the nozzle 100 can improve nozzle performance and overall workable life of the nozzle 108. The method can further include preventing back flow of second fuel 122 from the second fuel conduit 118 into the compressor space 160 upstream of the inner air conduit 126.

The method can further include thermally insulating the second fuel conduit 118 from hot air within the air conduit 126 with the heat shield 120.

The methods and systems of the present disclosure, as described above and shown in the drawings, provide for additional safety features in dual fuel nozzles using second fuel sources, by preventing unwanted back flow into the compressor, as well as limiting the possibility self-ignition of the second fuel by sealing against contact between the second fuel and the high velocity hot compressor air. While the apparatus and methods of the subject disclosure have been shown and described, those skilled in the art will readily appreciate that changes and/or modifications may be made thereto without departing from the scope of the subject disclosure.

What is claimed is:

1. A dual combustion system for an aircraft engine, comprising:
   a liquid fuel source including a biofuel or kerosene;
   a gaseous hydrogen fuel source; and
   a fuel nozzle assembly including:
      a first fuel conduit in fluid communication with the liquid fuel source, the first fuel conduit defined between a nozzle body and a fuel swirler, the first fuel conduit extending along a longitudinal axis from a first location to a first fuel outlet at an outlet end of the nozzle body;
      a second fuel conduit in fluid communication with the gaseous hydrogen fuel source, the second fuel conduit defined between the fuel swirler and a heat shield radially inward of the first fuel conduit, the second fuel conduit extending along the longitudinal axis from a second location to a second fuel outlet at an outlet end of the fuel swirler, the first location of the first fuel conduit disposed axially between the second location of the second fuel conduit and the outlet end of the nozzle body, an axial length of the second fuel conduit greater than that of the first fuel conduit, a cross-section area of the second fuel conduit smaller than that of the first fuel conduit;
      an air conduit radially inward of the second fuel conduit and extending through the heat shield along the longitudinal axis from an air inlet at an inlet end of the heat shield to an air outlet at an outlet end of the heat shield, the heat shield sealing the air conduit from the second fuel conduit between the air inlet and the air outlet, the air conduit having an axial length between the inlet end and the outlet end of the heat shield, the axial length of the air conduit greater than that of the second fuel conduit; and
      a feed arm coupled to the nozzle body;
      wherein the first fuel conduit is in fluid communication with a third fuel conduit extending through the feed arm, wherein the first fuel conduit passes through a first lateral port extending through the nozzle body in a first direction transverse to the longitudinal axis, and wherein the second fuel conduit is in fluid communication with a fourth fuel conduit extending through the feed arm, and wherein the second fuel conduit passes through a second lateral port extending through both the fuel swirler and the nozzle body in a second direction transverse to the longitudinal axis, and
      wherein the nozzle body and the fuel swirler each extend along the longitudinal axis from a nozzle tip into a cavity in the feed arm to a position upstream of the fourth fuel conduit relative to a fuel flow through the first fuel conduit and the second fuel conduit.

2. The dual combustion system as recited in claim 1, wherein the first fuel conduit and the second fuel conduit are annular, wherein the air conduit is cylindrical, and wherein the first fuel conduit, the second fuel conduit and the air conduit are concentric.

3. The dual combustion system as recited in claim 1, wherein the heat shield is an inner heat shield and the fuel nozzle assembly further comprises an outer heat shield mounted to the nozzle body.

4. The dual combustion system as recited in claim 3, wherein the outer heat shield is integrated to an air cap mounted to and radially outward of the nozzle body forming an insulative air gap between the air cap and the nozzle body, wherein the air cap further includes an outer air conduit defined therein.

5. The dual combustion system as recited in claim 1, further comprising an upstream seal and a downstream seal, the upstream seal and the downstream seal configured to seal between the feed arm and the nozzle body, wherein the third fuel conduit contained within the feed arm is positioned axially between the upstream seal and the downstream seal.

6. The dual combustion system as recited in claim 1, wherein an upstream portion of the heat shield is sealed to the fuel swirler to prevent backflow from the second fuel conduit into a compressor space upstream of the air conduit, relative to a flow of air through the heat shield.

7. The dual combustion system as recited in claim 1, wherein an upstream end of the air conduit is larger in diameter than a downstream end of the of the air conduit, and wherein the upstream end of the air conduit is shorter in axial length than the downstream end of the air conduit.

8. The dual combustion system as recited in claim 1, wherein the air conduit axially spans the full axial length of the second fuel conduit, and wherein the first fuel conduit extends along a majority of the axial length of the second fuel conduit.

9. The dual combustion system as recited in claim 1 wherein, the first fuel conduit issues a first fuel as a swirling, atomized spray into a combustor space.

10. The dual combustion system as recited in claim 1, wherein within the nozzle body, the first fuel conduit and the second fuel conduit are fluidly isolated from one another along a full length of the fuel swirler.

11. The dual combustion system as recited in claim 1, wherein the air conduit is devoid of any air swirlers, wherein no portion of the air conduit is defined by an air swirler.

12. The dual combustion system as recited in claim 1, wherein the air outlet at the outlet end of the heat shield and the second fuel outlet at the outlet end of the fuel swirler are at a same axial location along the longitudinal axis, and wherein the first fuel outlet at the outlet end of the nozzle body is disposed axially downstream from said same axial location relative to a flow of fuel through the fuel nozzle assembly.

13. The dual combustion system as recited in claim 1, wherein within the nozzle body, the air conduit is fluidly separated from the second fuel conduit along a full axial length of the fuel swirler.

* * * * *